United States Patent [19]
Morgan et al.

[11] Patent Number: 5,352,887
[45] Date of Patent: Oct. 4, 1994

[54] CIRCUIT FOR DETECTING A DROPLET IN MOTION AND METHOD THEREFOR

[75] Inventors: Damon Morgan; Horst Gempe, both of Phoenix, Ariz.

[73] Assignee: Motorola, Inc., Schaumburg, Ill.

[21] Appl. No.: 171,990

[22] Filed: Dec. 23, 1993

Related U.S. Application Data

[63] Continuation of Ser. No. 936,466, Aug. 28, 1992, abandoned.

[51] Int. Cl.$^5$ .................................... G01V 9/04
[52] U.S. Cl. ........................ 250/222.1; 250/208.2; 250/577
[58] Field of Search ............... 250/221, 222.1, 222.2, 250/223 R, 561, 208.2, 577; 356/335, 28

[56] References Cited

U.S. PATENT DOCUMENTS

| | | | |
|---|---|---|---|
| 3,718,822 | 2/1973 | Pascoe | 250/222.1 |
| 3,751,154 | 8/1973 | Frazee et al. | 250/208.2 |
| 3,809,910 | 5/1974 | Nellis | 250/561 |
| 3,812,348 | 5/1974 | Lippke | 250/561 |
| 3,907,429 | 9/1975 | Kuhn et al. | 356/28 |
| 4,023,599 | 5/1977 | Zekny | 250/559 |
| 4,449,191 | 5/1984 | Mehnert | 250/231.16 |
| 4,510,504 | 4/1985 | Tamai et al. | 250/222.1 |
| 4,574,238 | 3/1986 | Weinlich | 250/222.1 |
| 4,577,197 | 3/1986 | Crean et al. | 250/222.2 |
| 4,675,519 | 6/1987 | Price | 250/221 |
| 4,812,635 | 3/1989 | Kaufmann et al. | 250/208.2 |
| 4,812,643 | 3/1989 | Talbot | 250/222.1 |
| 4,900,913 | 2/1990 | Muro | 250/231.1 |
| 4,926,049 | 5/1990 | Nakamura et al. | 250/561 |
| 5,166,741 | 11/1992 | Gempe et al. | 356/28 |

FOREIGN PATENT DOCUMENTS

| | | | |
|---|---|---|---|
| 0635633 | 3/1962 | Italy | 250/222.1 |
| 0216017 | 9/1988 | Japan | 250/208.2 |
| 0313069 | 12/1988 | Japan | 356/28 |
| 0111762 | 5/1991 | Japan | 356/28 |

*Primary Examiner*—David C. Nelms
*Attorney, Agent, or Firm*—Michael D. Bingham; Gary W. Hoshizaki

[57] ABSTRACT

A circuit for detecting a substance in motion. A light source (11) emits light which is received by a first photodetector (16) and a second photodetector (18). Each of the photodetectors (16) and (18) receives substantially equal light intensities from the light source (11). The first photodetector (16) generates a first output voltage (17) which corresponds to light intensity. The second photodetector (18) generates a second output voltage (19) which corresponds to light intensity. A differential amplifier (21) has a first input coupled to the first output voltage (17) and a second input coupled to the second output voltage (19). A moving substance (13) passing between the light source (11) and the first (16) or second (18) photodetectors generates a differential voltage which is amplified by the differential amplifier (21).

18 Claims, 1 Drawing Sheet

CIRCUIT FOR DETECTING A DROPLET IN MOTION AND METHOD THEREFOR

This application is a continuation of prior application Ser. No. 07/936,466, filed Aug. 28, 1992, now abandoned.

BACKGROUND OF THE INVENTION

This invention relates, in general, to motion detector circuits, and more particularly to high sensitivity motion detector circuits.

There are many types of electro-mechanical devices which manipulate small moving substances. Substance parameters such as speed, location, or substance size is common information needed by control circuitry. Obtaining this information accurately can be extremely difficult for substances of small sizes, substances traveling at high speeds, or for transmissive substances. Under these types of conditions, sensing circuitry must be able to detect very small signal levels generated by the substance. The difficulty with detecting small signal levels is that the magnitude of the signals may be very close to noise levels of the system.

An example which embodies all conditions listed above is an ink jet printer. A small droplet is fired from a nozzle of an ink jet pen. The size of a droplet is approximately 70 picoliters and moves at a velocity exceeding 10 meters per second. Further adding to the problem is that an ink droplet is approximately 98% transmissive to infrared light which makes detection very difficult. A secondary problem is that ink jet printers also have multiple pens each firing a different color. A detection circuit must be able to equally detect characteristics of different colored ink droplets.

Generally, detection of a small moving substance, such as an ink droplet, involves a transmitted signal which the ink droplet disrupts and a receiver which detects changes in the transmitted signal. The receiver or sensor typically outputs a small signal which is amplified to increase signal magnitude. Sensing a substance becomes difficult when the substance is small or moves too fast to generate an appreciable signal. If the change in signal magnitude caused by the moving substance approaches noise levels at the input of the amplifier detection will be difficult.

Detection circuits currently being used are capable of sensing ink droplet sizes in the 70 picoliter range. Smaller droplet sizes (less than 70 picoliters) would generate signal levels which would be difficult to detect due to noise problems. Yet, smaller ink droplet sizes are being considered because printer resolution or print quality is directly related to ink droplet size. High resolution ink jet printers are being developed which fire ink droplets that are approximately 20 to 30 picoliters. It would be of great benefit if a circuit could be developed with increased sensitivity to allow detection of even smaller moving substances.

SUMMARY OF THE INVENTION

Briefly stated, this invention comprises circuitry for detecting a moving substance and a method thereof.

A light source illuminates an area in which a moving substance traverses. A first photodetector receives light from the light source and outputs a first voltage proportionate to light intensity.

A second photodetector receives a substantially similar light intensity as the first photodetector from the light source. The second photodetector outputs a second voltage proportionate to light intensity it receives.

The first and second voltages are respectively coupled to a first and second input of a differential amplifier. Common mode signals are not amplified by the differential amplifier. The differential amplifier has a predetermined gain.

The moving substance passing between the light source and the first or second photodetector reduces the light intensity received by the first or second photodetector causing a change in the first or second output voltage. A differential voltage is created across the differential amplifier which is amplified producing a detection signal..

DETAILED DESCRIPTION OF THE PREFERRED EMBODIMENT

Figure 1:
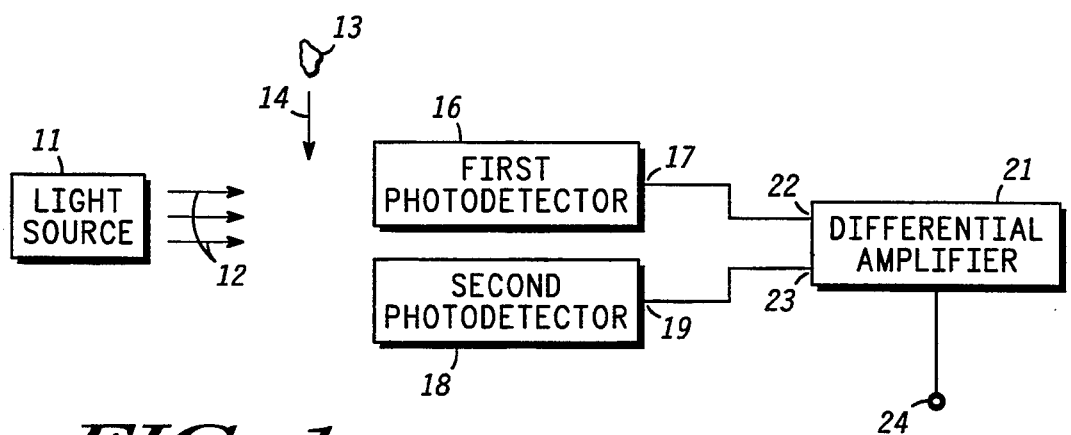
FIG. 1 is a block diagram of a circuit for detecting a substance in, motion in accordance with the present invention.

FIG. 1 is a block diagram of a circuit for detecting a substance in motion in accordance with the present invention.

A light source 11 emits light as indicated by a plurality of arrows 12. A moving substance 13 has a trajectory which is indicated by arrow 14 that passes through light emitted by light source 11.

A first photodetector 16 and second photodetector 18 are aligned to receive light from light source 11. In general, first photodetector 16 and second photodetector 18 receive substantially equal amounts of light from light source 11. Photodetectors 16 and 18 are serially aligned to the trajectory of moving substance 13 such that moving substance 13 passes by first photodetector 16 first and then passes by second photodetector 18 second. The trajectory of moving substance 13 places it between light source 11 and photodetectors 16 and 18: First photodetector 16 outputs a first output voltage 17 which is proportionate to light intensity it receives. Likewise, second photodetector 18 outputs a second output voltage 19 which is proportionate to light intensity it receives.

In the preferred embodiment, photodetectors 16 and 18 will output substantially equal voltages if each receives a substantially equal light intensity. Changes in output signal levels caused by moving substance 13 at first output voltage 17 and second output voltage 19 are small. Typically these voltage changes are 5 millivolts or less. Noise can have a similar magnitude as the signal levels generated by each photodetector 16 and 18.

Two photodetectors are needed to increase sensitivity of the detection circuit. Each photodetector 16 and 18 couples substantially equal noise to a differential input amplifier 21. In the preferred embodiment, differential input amplifier 21 is a low noise, high common mode rejection ratio differential input amplifier. First output voltage 17 is coupled to a first input 22 of differential input amplifier 21. Second output voltage 19 is coupled to a second input 23 of differential input amplifier 21. Differential input amplifier 21 amplifies the difference voltage between first output voltage 17 and second output voltage 19 created by moving substance 13. Both photodetectors 16 and 18 under ideal conditions will output substantially equal bias or "steady state" voltages (when no substance is present) and couple similar noise voltages to differential input amplifier 21. Common mode signals are not amplified by differential input amplifier 21 thus increasing the ability to detect and amplify the small differential signals levels created by moving substance 13.

A differential voltage is created across first input 22 and second input 23 of differential input amplifier 21 as moving substance 13 moves between light source 11 and first photodetector 16. Moving substance 13 refracts light from light source 11 which reduces light intensity received by first photodetector 16. First output voltage 17 is reduced proportionately to the reduced light intensity received by photodetector 16. Second output voltage 19 does not change, thus a differential voltage is created which is amplified by differential amplifier 21.

After moving substance 13 passes by first photodetector 16, first output voltage 17 returns to the "steady state voltage" which is substantially equal to second output voltage 19.

Moving substance 13 then moves between light source 11 and second photodetector 18. Light is refracted by moving substance 13 reducing the light intensity received by second photodetector 18. Second output voltage 19 is reduced proportionately to the reduced light intensity received by second photodetector 18. A differential voltage is thus created by the reduced second output voltage and first output voltage 17 at the "steady state voltage" which is amplified by differential amplifier 21.

Using this configuration not only simplifies detection of a moving substance but allows increased sensitivity for sensing smaller substances. Prior art circuitry using a single photodetector is limited by noise to sensing a moving ink droplet which has a volume of approximately 80 picoliters. Moving ink droplets having a volume of approximately 25 picoliters can be detected using two photodetectors and a differential amplifier as described above. Benefits other than higher sensitivity are also gained by this configuration. First and second output voltages 17 and 19 can be used in conjunction with one another to determine such things as 1) detection, 2) area of a moving substance, 3) speed of a moving substance, 4) trajectory of a moving substance, and 5) moving substance type (if more than one substance is being detected).

Figure 2:
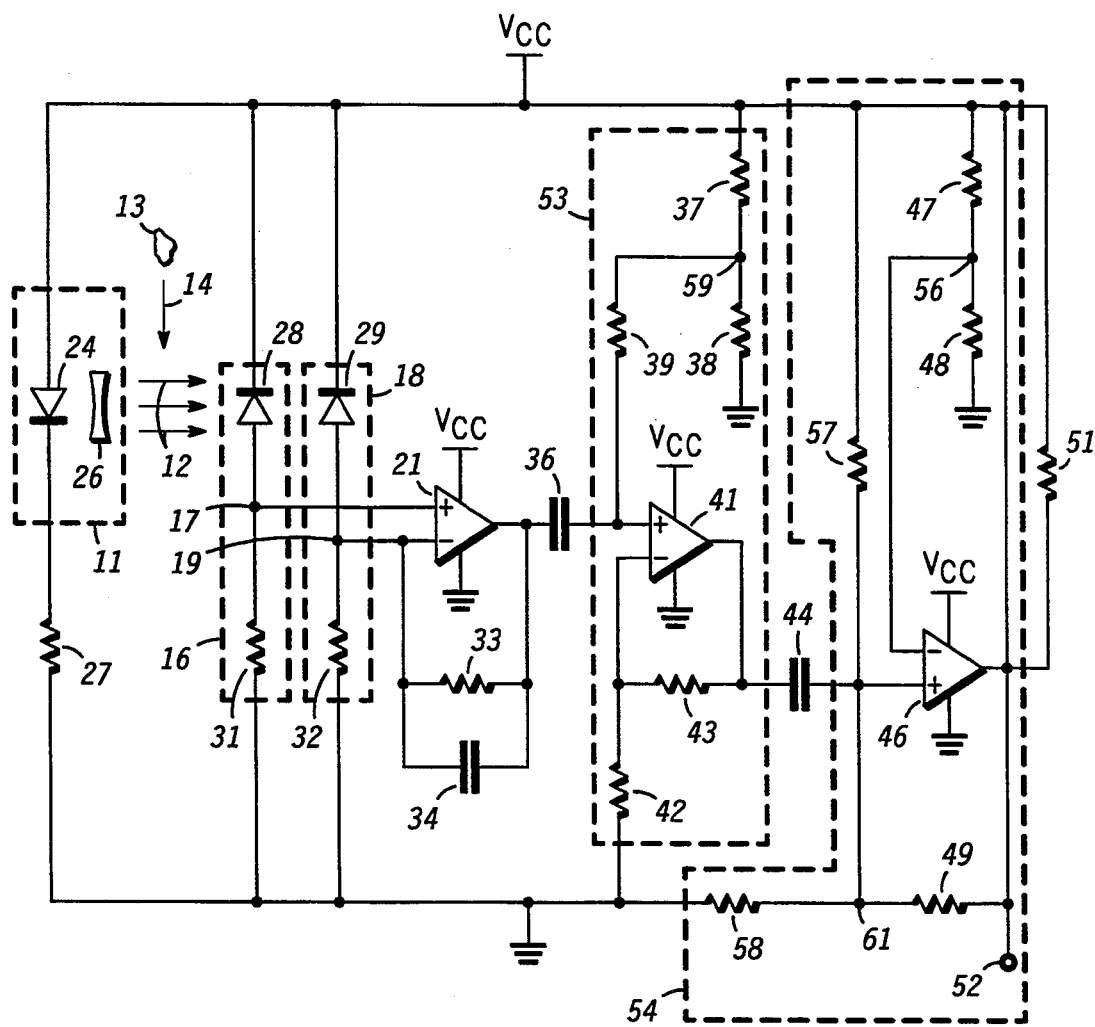
FIG. 2 is a schematic diagram of circuitry for detecting a substance in motion in accordance with the present invention.

FIG. 2 is a schematic diagram of circuitry for detecting a substance in motion in accordance with the present invention.

In the preferred embodiment, a light emitting diode (LED) 24 and a lens 26 form light source 11. A standard LED is used to reduce cost of the circuit for detecting a substance in motion. Lens 26 focuses light from LED 24 toward first photodetector 16 and second photodetector 18 as indicated by arrows 12. LED 24 has an anode coupled to a voltage Vcc and a cathode coupled to ground through a resistor 27. Resistor 27 biases LED 24 for a predetermined light intensity. In the preferred embodiment, light source 11 is used to detect moving ink droplets which are colored red, yellow, blue, and black. Each color of ink droplet will have specific wavelengths of light which each readily absorbs. This characteristic known as a light absorption peak could be used to enhance detection for a single color ink droplet. LED 24 is chosen to output light having an average wavelength of approximately 940 nanometers. The 940 nanometer light output by LED 24 is outside any of the absorption peaks for red, yellow, blue, and black ink droplets so each color ink droplet generates similar signal levels from photodetectors 16 and 18.

A pin diode 28 and a resistor 31 forms first photodetector 16. Pin diode 28 has a cathode coupled to voltage Vcc and an anode coupled to ground through resistor 31. A pin diode is chosen for it's sensitivity to light and fast response time. Light passing through lens 26 aligned to pin diode 28 is absorbed and generates carriers in pin diode 28. A bias current is created by the light generated carriers. In the preferred embodiment, the bias current is approximately 550 nanoamps. A voltage developed across resistor 31 corresponds to first output voltage 17 of photodetector 16. Resistor 31 is chosen to generate a "steady state" output voltage with the bias current under a condition when no moving substance is present.

A pin diode 29 and a resistor 32 forms second photodetector 18. Pin diode 29 has a cathode coupled to voltage Vcc and an anode coupled to ground through a resistor 32. Pin diode 29 is aligned to light passing through lens 26 which it absorbs and generates carriers. In the preferred embodiment, pin diode 29 is substantially equal to pin diode 28 and receives a substantially equal light intensity as pin diode 28. Resistor 32 is chosen having an equivalent resistance to resistor 31 thereby generating a second output voltage 19 there across which is substantially equal to first output voltage 19 when no moving substance is present (bias current approximately 550 nanoamps).

Pin diodes 28 an 29 are aligned serially to the trajectory of moving substance 13. The trajectory is indicated by arrow 14. As described in FIG. 1 moving substance 13 moves between light source 11 and photodetector 16 or photodetector 18 which generates a differential voltage between first output voltage 17 and second output voltage 19.

Moving substance 13 may be as small as a 20 picoliter ink droplet and develops a 5 millivolt drop in voltage (approximately) at first output voltage 17 or second output voltage 19 as it passes by pin diodes 28 and 29 respectively. In the preferred embodiment, the ink droplet has an area smaller than an area of either photodetector 16 or 18. Also, spacing between photodetectors 16 and 18 is such that an ink droplet does not overlap photodetectors 16 and 18 simultaneously if so desired. This is not a critical parameter and the circuit for detecting a substance in motion can be designed with overlap and smaller spacing between detectors.

The dual pin diode configuration is critical to sensing the small voltages generated by an ink droplet. Prior art circuits use a single sensing element to generate a detect voltage. Problems arise with a single sense element due to background noise. Noise, if large enough, can mask the voltage change caused by the ink droplet making detection difficult or triggering a "false detect" when no substance is present. Noise induced problems are minimized using the detection circuit of the present embodiment by coupling first output voltage 17 to a first input of a differential input operational amplifier 21 and coupling second output voltage 19 to a second input of the differential input operational amplifier 21. Each photodetector 16 and 18 are substantially equal in characteristics thus each couples substantially equal noise or common mode noise to the inputs of operational amplifier 21. Operational amplifier 21 rejects common mode signals and amplifies voltage differences between first output voltage 17 and second output voltage 19. Increased sensitivity is the result of this configuration.

In the preferred embodiment, operational amplifier 21 is an amplifier from a MC34074D quad operational amplifier integrated circuit manufactured by Motorola Inc.. This does not preclude the use of any other operational amplifier having similar characteristics. First output voltage 17 is coupled to a (+) input or non-inverting input of operational amplifier 21. Second output voltage 19 is coupled to a (−) input or inverting input of operational amplifier 21. Resistor 33 couples the (−) input to an output of operational amplifier 21. In the preferred embodiment, resistor 33 sets a DC gain of operational amplifier 21 to approximately a gain of 10. A capacitor 34 is place in parallel to resistor 33 to role off gain at high frequencies.

A second gain stage 53 further amplifies signals generated by moving substance 13. A capacitor 36, AC couples the output of amplifier 21 to a (+) input of an operational amplifier 41. A resistor 43 is coupled from a (−) input to an output of operational amplifier 41. The (−) input of operational amplifier 41 is coupled to ground through a resistor 42. In the preferred embodiment, resistors 43 and 42 set the gain of operational amplifier 41 to approximately 100. A series resistor divider is formed by a resistor 37 and a resistor 38 between Vcc and ground generating a bias voltage at a node 59. Resistor 39 couples the voltage developed at node 59 to the (+) input of operational amplifier 41 which is amplified to set the output of operational amplifier 41 at a predetermined voltage. In the quiescent operating state, the output of operational amplifier 41 is set to approximately 0.43×Vcc which allows a positive and negative signal swing at the output. Operational amplifier 41 is an amplifier from the MC34074D quad operational amplifier integrated circuit.

A Schmitt trigger 54 is a final stage of amplification which outputs a digital logic state indicating detection of a moving substance. Schmitt trigger 54 is designed to change states when a preset threshold is exceeded, thereby minimizing a risk of false triggering due to noise. A capacitor 44, AC couples the output of operational amplifier 41 to a (+) input of an operational amplifier 46. A resistor divider formed by a resistor 47 and a resistor 48 series coupled between Vcc and ground set up a bias voltage at a (−) input of operational amplifier. Node 56 (the interconnection between resistors 47 and 48) is coupled to the (−) input of operational amplifier 46 and sets up a bias voltage of approximately 0.28×Vcc. Similarly a resistor divider formed by a resistor 57 and a resistor 58 are series coupled between Vcc and ground and sets up a bias voltage at a (+) terminal of operational amplifier 46. Node 61 (the interconnection between resistors 47 and 48) is coupled to the (+) input of operational amplifier 46. Resistor 57 is substantially equal to resistor 47 and resistor 58 is substantially equal to resistor 48. A resistor 49 is coupled from the (+) input to an output 52 of operational amplifier 46. Resistor 49 provides hysteresis to Schmitt trigger 54 which modifies the switching threshold as a function of the output logic state of operational amplifier 46. In the preferred embodiment, operational amplifier 46 is an amplifier from the MC34074D quad operational amplifier integrated circuit manufactured by Motorola Inc.. A pull up resistor 51 is coupled from voltage Vcc to output 52 of operational amplifier 46. Resistor 51 initializes output 52 to a one logic state (first state) during power up.

Operation of the circuit for detecting a moving substance is best described by following moving substance 13 as it passes between light source 11 and photodetectors 16 and 18. Output 52 of operational amplifier 46 is set at a logic one state when no substance is present. First output voltage 17 is reduced proportionate to the change in light intensity created by moving substance 13 as it passes between light source 11 and pin diode 28. Second output voltage 19 is at a "steady state" voltage. The difference between the first output voltage 17 and second output voltage 19 is amplified by operational amplifier 21 which creates a negative swing at its output. Operational amplifier 41 amplifies the change in output of operational amplifier 21. Output 52 of Schmitt trigger 54 changes from a logic one state to a logic zero state (second state). The logic zero state indicates a substance has been detected.

After moving substance 13 moves past pin diode 28 first output voltage 17 returns to a "steady state" voltage. Outputs of operational amplifiers 21 and 41 will also return to a "steady state" voltage. When the output of operational amplifier 41 surpasses a predetermined threshold of Schmitt trigger 54, output 52 is reset to a logic one state indicating no substance is present.

Moving substance 13 then moves between light source 11 and photodetector 18. Second output voltage 19 is reduced a proportionate amount with respect to a reduction in light intensity to second photodetector 18. First output voltage 17 is at the "steady state" voltage. The difference between the first output voltage 17 and second output voltage 19 is amplified by operational amplifier 21 which creates a positive swing at its output. When the circuit for detecting a moving substance is used only for detection, signals generated by moving substance 13 passing between light source 11 and second photodetector 18 does not change output 52 which is in a one logic state. Moving substance 13 continues past photodetector 18 and second output voltage 19 returns to a "steady state" voltage. Outputs of operational amplifiers 21 and 41 will also return to a "steady state" voltage.

Information concerning moving substance 13 can be obtained using the output of operational amplifier 41. A peak magnitude obtained from moving substance 13 passing by either the first photodetector 16 or second photodetector 18 can be translated to surface area of moving substance 13 refracting light. Peak magnitude corresponds to a maximum surface area of moving substance 13 refracting light not received by photodetectors 16 or 18. Speed of moving substance 13 can be determined by timing moving substance 13 traveling between photodetectors 16 and 18 and knowledge of the distance between timing events. The trajectory can be determined by shaping the photodetector areas to output different voltages dependent on where a moving substance traverses the photodetector. Each different substance detected may generate a "signature" output which can be used to determine substance type. These are only a few of the different substance parameters which can be obtained by this invention.

LED 24 and pin diodes 28 and 29 cannot be located on the same semiconductor chip because they must spaced apart such that a moving substance can pass between them. It is obvious that all other components of this invention can be integrated on a single monolithic chip containing either LED 24 or pin diodes 28 and 29 to reduce costs in manufacturing, increase simplicity, and reduce physical size. By now it should be appreciated that a circuit for detecting a substance in motion has been shown which reduces noise problems and increases sensitivity for detecting small substances.

We claim:

1. A circuit for detecting a droplet in motion comprising:
    a light source for emitting light;
    a first photodetector receiving light directly emitted by said light source for generating a first output voltage and producing a change in said first output voltage as the droplet moves between said light source and said first photodetector;
    a second photodetector receiving light directly emitted by said light source for generating a second output voltage and producing a change in said first output voltage as the droplet moves between said light source and said first photodetector;
    a second photodetector receiving light directly emitted by said light source for generating a second output voltage and producing a change in said output voltage as the droplet moves between said light source and said second photodetector, said first and second photodetectors are serially aligned such that the substance in motion is sensed by said first photodetector first and said second photodetector second and said light source aligned for projecting a substantially equal light intensity on said first and second photodetectors; and
    a first amplifier stage having a first input coupled to said first photodetector and a second input coupled to said second photodetector for producing an amplified single ended output signal corresponding to said changes in said first and second input voltages at an output thereof, said first and second photodetectors being coupled to said first amplifier stage to common mode noise for increasing sensitivity to the droplet.

2. The circuit of claim 1 wherein said light source includes a light emitting diode.

3. The circuit of claim 2 wherein said light emitting diode generates a focused beam of light toward said first and second photodetectors.

4. The circuit of claim 2 wherein said light source includes a lens for focusing light from said light emitting diode towards said first and second photodetectors.

5. The circuit of claim 1 wherein said first photodetector includes a first pin diode series coupled to a first resistor; and said second photodetector includes a second pin diode series coupled to a second resistor wherein said first and second pin diodes are reverse biased in a quiescent operating state.

6. The circuit of claim 5 wherein said first pin diode and said second pin diode are disposed within a single monolithic semiconductor chip to give said first and second pin diodes substantially similar characteristics and wherein said first and second resistors are substantially similar.

7. The circuit of claim 6 wherein an active area of said first pin diode and an active area of said second pin diode is larger than an area of the substance to allow for misalignment in said substance trajectory.

8. The circuit of claim 1 further including:
    a second amplifier stage for amplifying said output signal of said first amplifier stage; and
    a Schmitt trigger for amplifying an output signal of said second amplifier stage wherein said Schmitt trigger outputs a digital logic signal having first and second logic states accordingly.

9. The circuit of claim 8 wherein said output of said first amplifier stage is AC coupled to an input of said second amplifier stage and wherein said output of said second amplifier stage is AC coupled to an input of said Schmitt trigger.

10. A method for detecting and determining physical parameters of a moving droplet comprising:
    serially aligning a first and a second photodetector to a trajectory of the moving droplet wherein the moving droplet passes by said first photodetector first and then said second photodetector second, said first and second photodetectors being located to receive substantially equal noise under operating conditions and for providing first and second output voltages respectively;
    illuminating said first and second photodetectors with a substantially equal light intensity wherein the moving droplet reduces light intensity being received by either said first or second photodetectors when passing by;
    amplifying said first and second output voltages with a differential input to single ended output amplifier for rejecting common mode noise thereby increasing sensitivity to the moving droplet.

11. The method of claim 10 wherein the step of serially aligning a first and a second photodetector includes:
    forming said first photodetector and said second photodetector on a common semiconductor substrate adjacent to one another, said first and second photodetectors having an area substantially larger than the moving droplet.

12. The method of claim 10 wherein said step of illuminating said first and second photodetectors includes focusing light from a light source to said first and second photodetectors with a lens and further including converting an output signal of said differential input to single ended output amplifier to a digital logic state with a Schmitt trigger.

13. A detection circuit comprising:
    a light emitting diode;
    a lens responsive to said light emitting diode for focusing light therefrom;
    a first pin diode formed on a semiconductor chip exposed for receiving light from said lens wherein said first pin diode is reverse biased;
    a first resistor for biasing said first pin diode wherein a first output voltage is developed across said first resistor;
    a second pin diode formed on said semiconductor chip exposed for receiving light from said lens wherein light intensity received by said second pin diode is substantially equal to light intensity received by said first pin diode, wherein said second pin diode is reverse biased, and wherein said first and second pin diodes are serially aligned to a trajectory of a moving droplet;
    a second resistor for biasing said second pin diode wherein a second output voltage is developed across said second resistor;
    a differential to single ended output amplifier having a first input coupled to receive said first output voltage, a second input coupled to receive said second output voltage, and an output at which an output signal is produced responsive to the respective light intensities received by said first and second pin diodes varying wherein said differential input amplifier has a predetermined gain and wherein said differential to signal ended output amplifier rejects common mode signals of said first and second voltages for increasing sensitivity to said moving droplet;

an amplification stage having an input coupled to aid output of said differential input amplifier, an output, and a having predetermined gain, said amplification stage producing an output signal responsive to said output signal from said differential to single ended output amplifier; and a Schmitt trigger having an input coupled to said output of said second amplification stage output and an output which produces a digital output signal.

14. The detection circuit of claim 13 wherein said first and second pin diodes are matched and said first and second resistors are matched to provide substantially equal characteristics.

15. The detection circuit of claim 13 wherein said first and second pin diodes are aligned in series to a trajectory of a moving substance such that said moving substance passes by said first pin diode first and said second pin diode second thereby causing said light intensities received by said first and second pin diodes to vary respectively.

16. The detection circuit of claim 15 wherein said first and second pin diodes are spaced a predetermined distance apart and wherein an area of said first and second pin diodes is larger than an area of said moving substance.

17. The detection circuit of claim 13 wherein said second amplification stage output signal is used to determine the substance area and velocity.

18. The detection circuit of claim 13 wherein said output of said differential to single ended output amplifier is AC coupled to said input of said amplification stage and wherein said output of said amplification stage is AC coupled to said input of said Schmitt trigger.

* * * * *

UNITED STATES PATENT AND TRADEMARK OFFICE
CERTIFICATE OF CORRECTION

PATENT NO.  : 5,352,887
DATED       : October 4, 1994
INVENTOR(S) : Damon Morgan et al.

It is certified that error appears in the above-indentified patent and that said Letters Patent is hereby corrected as shown below:

In column 7, claim 1, lines 13-17 delete "a second photodetector receiving light directly emitted by said light source for generating a second output voltage and producing a change in said first output voltage as the droplet moves between said light source and said first photodetector;".

Signed and Sealed this

Twenty-seventh Day of June, 1995

Attest:

BRUCE LEHMAN

*Attesting Officer*     *Commissioner of Patents and Trademarks*